UNITED STATES PATENT OFFICE.

VICTOR LENHER, OF MADISON, WISCONSIN.

COMPOUND AND METHOD OF PRODUCING SAME.

1,385,081.  Specification of Letters Patent.  Patented July 19, 1921.

No Drawing.  Application filed August 4, 1920. Serial No. 401,218.

*To all whom it may concern:*

Be it known that I, VICTOR LENHER, a citizen of the United States, residing at Madison, in the county of Dane and State of Wisconsin, have invented a new and useful Improvement in Compounds and Methods of Producing Same, of which the following is a specification.

This invention relates to novel compounds and the method of producing the same. The invention is based upon the discovery by me that selenium oxychlorid ($SeOCl_2$) will dissolve many substances.

I have discovered that selenium oxychlorid is a solvent for the oxids of molybdenum, selenium, arsenic and vanadium. It is not a solvent for the oxids of titanium, tungsten, zirconium, columbium and tantalum. Hence, it is possible to effect separation of materials in compounds containing both the soluble and insoluble materials.

I have discovered that the common metals in general are attacked or dissolved by selenium oxychlorid. This includes such metals as aluminum, zinc, iron, lead, tin, etc. Also, that the non-metals, in general, are attacked or dissolved by selenium oxychlorid. Among these may be given as examples, selenium, sulfur, iodin, tellurium, and phosphorus. In a number of these reactions, novel compounds are produced. Certain of the non-metals, such as silicon and boron, are not attacked by selenium oxychlorid.

I have discovered also that selenium oxychlorid is a solvent for a number of hydrocarbons, while it is not a solvent for others. This enables some very important separations and purifications to be effected by the use of this material as a solvent. Selenium oxychlorid reacts with unsaturated hydrocarbons such as acetylene, amylene, turpentine, mesitylene, cymene, pseudo cumene, anthracene, naphthalene, and diphenylmethyl, and with these unsaturated compounds forms derivatives. With the saturated hydrocarbons of the aliphatic series it does not unite. For example, the pure hydrocarbons, pentane, hexane, heptane, decane, are insoluble and immiscible in this solvent. Certain other hydrocarbons, such as toluol and benzol, dissolve readily in selenium oxychlorid. By means of the use of selenium oxychlorid certain hydrocarbons can be extracted from various substances, thus enabling separations and purifications to be effected. As an example I may mention the extraction of impurities including hydrocarbons from charcoal or other forms of carbonized substances in accordance with the method set forth in No. 411,258 filed in the United States Patent Office September 18, 1920.

In the case of purification of charcoal for example, the carbon is activated, thus making it a valuable absorbent for gases and liquids.

I have discovered further that selenium oxychlorid is a solvent for rubber, both the pure rubber and the vulcanized rubber. It is a solvent for phenolic condensation products, including both the fusible and infusible products. Such products, in their final state, have long been regarded as insoluble. I have discovered that the so-called insoluble condensation products are soluble in selenium oxychlorid and in selenium oxychlorid compounded with sulfur trioxid. This includes products known on the market as redmanol, bakelite, condensite, etc. The substances are also a solvent for resinous materials or binders in general, including the natural resins, glues (including casein glues), gelatin, celluloid, varnish, lacquer and paints. Selenium oxychlorid and the compound of selenium oxychlorid mentioned may be employed practically as paint, varnish and enamel removers.

I have discovered further that selenium oxychlorid attacks and dissolves proteins, including wool, silk, hair, bristles, leather, etc., but reacts in the absence of water very poorly or not at all on starch and cellulose, including wood and wood pulp. This enables certain separations and purifications to be effected in connection with this class of materials.

Selenium oxychlorid alone or compounded with a modifying agent will react with vegetable, animal and fish oils, and certain greases, forming new products which are resin-like or rubber-like in character. This enables novel binder compounds, coating compounds, and substitutes for rubber and resin compounds to be provided. For example, with linseed oil and fish oil, selenium oxychlorid yields products which are waterproof and rubber-like in character. The last-mentioned products are insoluble in the ordinary solvents; this is also true of other of the products herein mentioned. The solvent may be used, also, as a grease remover.

It may be stated in general that selenium oxychlorid is a safe reagent to use. While it is a liquid which is acid in character and is decomposed by moisture, the substance is no more harmful to man than is hydrochloric acid.

I have discovered also that selenium oxychlorid acts as a fire extinguisher of the same general type as carbon tetrachlorid, or the commonly used pyrene. Selenium oxychlorid is itself soluble in carbon tetrachlorid ($CCl_4$) and in chloroform ($CHCl_3$). While the power and range of action of selenium oxychlorid may be enhanced or enlarged by the addition of such a compound as sulfur trioxid, the action of the material as a solvent may also be lessened or retarded by the employment of a suitable diluent, such as carbon tetrachlorid, or chloroform, used in suitable proportion.

In connection with the discovery that selenium oxychlorid, alone or compounded with a modifying agent, is a solvent for numerous hydrocarbons, while it is not a solvent for other hydrocarbons, it may be stated that this peculiarity or property renders it possible to separate, for example, unsaturated from saturated hydrocarbons. For example, amylene ($C_5H_{10}$) may be separated from heptane ($C_7H_{16}$), and heptane may be separated from benzol ($C_6H_6$). Thus a mixture of amylene and heptane may be introduced into selenium oxychlorid. This will dissolve the amylene, and the heptane will appear as an insoluble supernatant liquid, which may be decanted. The amylene will unite chemically with the seleni-oxychlorid. In the case of benzol and heptane, the benzol is simply dissolved and may be recovered by fractional distillation.

Because of the powerful solvent qualities of selenium oxychlorid and the still more powerful solvent qualities of selenium oxychlorid compounded with sulfur trioxid, it is desirable that operations with these materials be practised in vessels composed of, or lined with, such materials as will not be attacked by the solvent. For example, glass or terra cotta vessels, or vessels lined with these materials may be employed. In cases where the solvent is employed for removing varnish, from metal, suitable precautions should be taken to remove the metal from the solvent before the metal is substantially attacked by the solvent. In the case of the removal of a coating from wood, less care is necessary, because the solvent will not readily attack cellulose.

$SeOCl_2$ may be obtained in accordance with the process described in my application No. 381,628, filed in the United States Patent Office May 15, 1920.

From the foregoing description, it will be evident that I have discovered many useful applications of selenium oxychlorid, and selenium oxychlorid compounded with a modifying agent. The detailed description has been given for clearness of understanding only, and no unnecessary limitations should be understood therefrom, but the appended claims should be construed as broadly as permissible, in view of the premises.

What I regard as new, and desire to secure by Letters Patent, is—

1. The method of producing a solution of a substance which comprises subjecting such substance to the action of selenium oxychlorid alone or compounded with a modifying agent.

2. The method of producing a solution of a selenium-free substance, which comprises subjecting such substance to the action of selenium oxychlorid.

3. The method of dissolving a substance which comprises subjecting the same to the action of selenium oxychlorid compounded with a modifying agent.

4. The method of dissolving a substance which comprises subjecting such substance to selenium oxychlorid compounded with an active substance which enhances its solvent powers.

5. The method of producing a solution of a substance, which comprises subjecting such substance to the action of selenium oxychlorid compounded with an active compound of sulfur and oxygen.

6. The method of effecting the separation of the elements of a compound, which comprise subjecting such compound to the solvent action of selenium oxychlorid, alone or compounded with a modifying agent, extracting a desired element, and then separating such element from the solution.

7. The method of effecting separation of soluble and insoluble materials in a compound, which comprise subjecting such compound to the solvent action of selenium oxychlorid, alone or compounded with a modifying agent, thus placing the soluble material in solution, and then separating the insoluble material from the solution.

8. The method of purifying material, which comprises treating the same with selenium oxychlorid, alone or compounded with a modifying agent.

9. The method of recovering metal from ore, which comprises treating ore with selenium oxychlorid, alone or compounded with a modifying agent, and then separating the solution from the insoluble substances.

10. The method of recovering metal from ore, which comprises treating the ore with selenium oxychlorid, alone or with a modifying agent, separating the solution from the insoluble substances, and then recovering the metal from the solution.